Jan. 11, 1927.
E. B. WADDELL, JR
1,613,859
AUTOMATIC GREASE FEEDER
Filed August 2, 1926
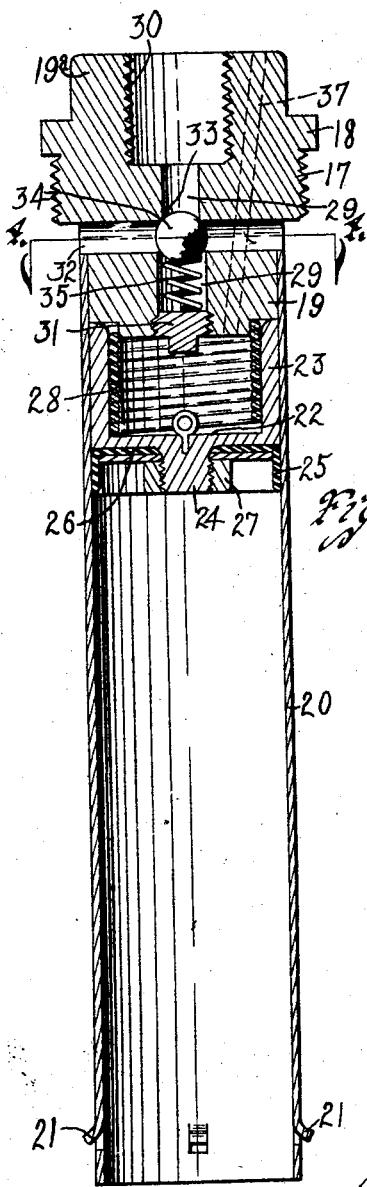
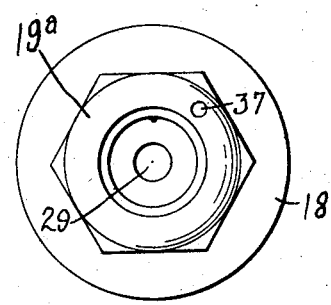
Fig.3.
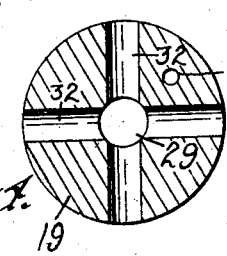
Fig.4.
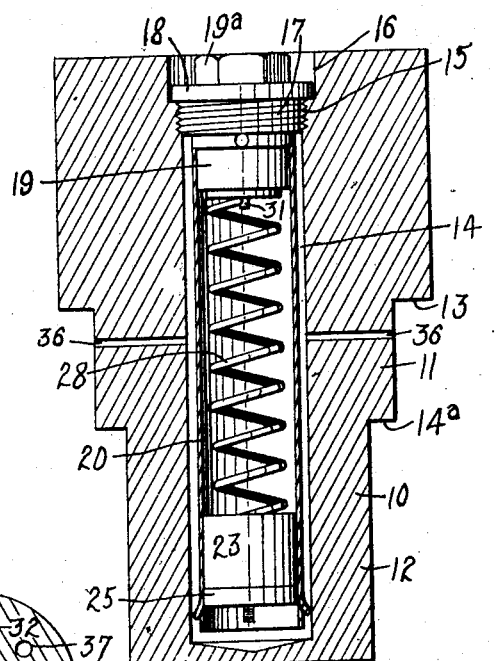
Fig.1.
Inventor
Edward B. Waddell Jr.
by Bair & Freeman Attorneys
Witness
L. F. Sandberg Patented Jan. 11, 1927.

1,613,859

UNITED STATES PATENT OFFICE.

EDWARD B. WADDELL, JR., OF VALLEY JUNCTION, IOWA.

AUTOMATIC GREASE FEEDER.

Application filed August 2, 1926. Serial No. 126,459.

The object of my invention is to provide an automatic grease feeder for supplying lubricant to engaging surfaces.

More particularly, it is my purpose to provide a device of this general character, wherein there is provided a cavity in one member for containing lubricant, and means for subjecting the lubricant in the cavity or reservoir to constant, yielding pressure for forcing the lubricant from the reservoir to the bearing surfaces.

A further purpose of my invention is to provide in an automatic grease feeder of the character mentioned a structure, which facilitates filling the cavity or reservoir from a grease gun or the like, and which is so constructed as to automatically prevent escape of grease through the inlet therefore.

A further purpose of the present invention is to provide a grease reservoir or cavity, the plunger or piston therein, a yielding means for bearing on the piston, and to so construct the parts as to provide means whereby the workmen may readily determine when the reservoir or cavity has been filled.

Still another object is to provide such a device so constructed and arranged that the working parts may be readily and easily removed for purposes of replacement or repair.

With these and other objects in view, my invention consists in the construction, arrangement and combination of the various parts of my automatic grease feeder, whereby the objects contemplated are attained, as hereinafter more fully set forth, pointed out in my claims, and illustrated in the accompanying drawings, in which:

Figure 1 is a vertical, section through an automatic grease feeder embodying my invention, illustrating the parts in position before the reservoir is filled with lubricant.

Figure 2 is an enlarged, similar view illustrating the position of the spring and plunger or piston after lubricant has been forced into the reservoir taken on the line 2—2 of Figure 3.

Figure 3 is an end view of the device; and

Figure 4 is a sectional view taken on the line 4—4 of Figure 2.

In the accompanying drawings, I have used the reference numeral 10 to indicate generally a member, such for example as a spindle upon which a wheel or the like may be journaled.

The spindle 10 has the reduced portions 11 and 12 with the shoulders 13 and 14ᵃ adjacent thereto. This form of device is shown simply for purposes of illustration, and it will be understood that my automatic grease feeder may be used wherever it would be applicable to form of installation.

The spindle 10 is provided with a longitudinal bore 14, preferably open at one end and closed at the other. The bore 14 may be slightly enlarged and threaded as at 15 near its outer end and further enlarged at 16 at its outer end.

Screwed into the threaded portion 15 of the bore 14 is a plug 17, having at its outer portion the flange 18 and the angular head 19ᵃ of considerably smaller maximum diameter than the flange 18 adapted to receive a wrench.

The plug 17 has a reduced portion 19 projected into the bore 14, as shown. Mounted on the reduced portion 19 is one end of a hollow tube 20, which projects into the bore 14 almost to the closed end thereof.

The tube 20 is provided with projecting spaced or centering fingers 21 for holding it properly centered in the bore 14. The bore 14 and tube 20 form a reservoir for lubricant.

Received in the tube 20 is a plunger or cylinder comprising a disc or the like 22 having an annular flange 23 projecting toward the reduced portion 19 of the plug 17.

The disc 22 has on its opposite side a projecting threaded cylindrical lug 24. Adjacent to the disc 22 is an ordinary leather cup washer 25 received on the lug 24 and held in place by a washer 26 and nut 27.

A coil spring 28 of sufficient strength for the purpose is arranged between the disc 22 and the reduced portion 19 of the plug 17. The spring 28 is shown in its normally extended position in Figure 1.

Extending longitudinally through the entire plug 17 is a bore or passage 29, the outer portion of which is enlarged and internally screw-threaded as at 30. The inner end of the bore 29 is closed by a plug 31. At a point intermediate of the length of the bore 29 and preferably just beyond the end of the tube 20 a plurality of radial passages 32 extend from the passage or bore 29 to the surface of the reduced portion 19 of the plug 17.

Assuming that the device, as shown in Figure 2, is in upright position, the wall of the passage 29 just above the passages 32 forms a valve seat 33, with which cooperates a ball valve 34. A coil spring 35 cooperates with the plug 31 and the ball valve 34 for holding the valve normally, yieldingly closed.

Passages 36, such as are shown in Figure 1, extend from the bore for affording means, whereby lubricant can be forced from the reservoir to the bearing surface.

A sighting or gauging hole or passage 37 leads from the outer end of the plug 17 entirely through the plug.

Assuming that the parts are in their normal positions shown in Figure 1, and that the device as shown in Figure 2, is installed in a suitable environment as in the bore 14 of the spindle 10, and that it is desired to fill the reservoir with lubricant, the nozzle of a grease gun is screwed into the threaded portion 30 of the outer end of the bore 29 in the plug 17. Lubricant is forced inwardly and will force the valve 34 away from its seat and compress the spring 35. The grease passes through the outer portion of the bore 29 to the passages 32 and thence through them to the space outside the reduced portion 19 of the plug 17 within the bore 14. The grease then passes between the tube 20 and the wall of the bore 14 to the inner open end of the tube 20 and thence into the tube.

The pressure on the grease forces the plunger or piston outwardly and compresses the spring 28 to the position shown in Figure 2. The plunger thus moves from the position shown in Figure 1 to its position shown in Figure 2.

It will be noted that we have omitted from Figure 2 the environmental spindle 10, for more clearly showing the device as an attachment.

By inserting a gauge wire or rod into the passage 37, it is easy to determine when the reservoir has been completely filled with lubricant, and the plunger forced to position adjacent to the plug 17.

When the grease gun is removed and the pressure on the valve 34 is reduced, the spring 35 will close the valve 34, so that no lubricant will escape through the bore 29. The lubricant in the reservoir will then be subject to the constant pressure of the spring 28 and will be forced from the tube 20 around its ends and between the tube 20 and the wall of the bore 14 to the passages 36 and thence through them to the bearing surfaces, which are to be lubricated.

It will be seen that I have provided a device which can be manufactured in a factory as a unit and assembled as a unit, and then simply screwed into the cavity or bore where it is to be installed.

The entire device can be quickly and easily taken out for purposes of repair and replacement.

The disc 22 may be provided with a loop or the like 40 to coact with a hook for pulling out the plunger.

Another important advantage of this structure lies in the fact that there is afforded a general structure which permits the provision of the passage 37 to receive a gauge rod or wire or the like, whereby the workmen may easily determine when the reservoir has been filled with lubricant.

Changes may be made in the details of the arrangement and construction of the parts of my improved automatic grease feeder without departing from the real spirit and purpose of my invention, and it is my intention to cover by my claims, any modified forms of structure or use of mechanical equivalents, which may be reasonably included within their scope.

I claim as my invention:

1. In an automatic grease feeder, the combination of a member having a bore and a passage leading therefrom, with a plug in the end of the bore, having a passage for lubricant, a hollow cylinder of less diameter than the bore extending from the plug into the bore, the parts being arranged to permit lubricant to be forced from the passage in the plug to the opposite end of the bore and thence into the cylinder, and a spring-pressed plunger in the cylinder tending to force lubricant therefrom.

2. In an automatic grease feeder, the combination of a member having a bore and a passage leading therefrom, with a plug in the end of the bore, having a passage for lubricant, a hollow cylinder of less diameter than the bore extending from the plug into the bore, the parts being arranged to permit lubricant to be forced from the passage in the plug to the opposite end of the bore and thence into the cylinder, a spring-pressed plunger in the cylinder tending to force lubricant therefrom, and a check valve in the passage in the plug.

3. In an automatic grease feeder, the combination of a member having a bore and a passage leading therefrom, with a plug in the end of the bore, having a passage for lubricant, a hollow cylinder of less diameter than the bore extending from the plug into the bore, the parts being arranged to permit lubricant to be forced from the passage in the plug to the opposite end of the bore and thence into the cylinder, and a spring-pressed plunger in the cylinder tending to force lubricant therefrom, said bore having a passage therethrough to admit a gauge to the interior of the cylinder.

EDWARD B. WADDELL, Jr.